United States Patent
Mohrschladt et al.

(10) Patent No.: US 6,355,737 B1
(45) Date of Patent: Mar. 12, 2002

(54) METHOD FOR PRODUCING POLYMER MIXTURES COMPRISED OF AMINO NITRILES AND THERMOPLASTIC POLYMERS

(75) Inventors: Ralf Mohrschladt, Schwetzingen; Martin Weber, Maikammer; Volker Hildebrandt, Mannheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,415

(22) PCT Filed: Feb. 28, 1999

(86) PCT No.: PCT/EP99/01257

§ 371 Date: Aug. 16, 2000

§ 102(e) Date: Aug. 16, 2000

(87) PCT Pub. No.: WO99/43733

PCT Pub. Date: Sep. 2, 1999

(30) Foreign Application Priority Data

Feb. 27, 1998 (DE) .......................... 198 08 489

(51) Int. Cl.$^7$ .......................... C08L 77/00; C08G 69/04; C08G 69/00
(52) U.S. Cl. .................. 525/420; 525/422; 525/432; 525/436; 525/63; 525/70; 525/71; 528/170; 528/310; 528/322; 528/332; 528/353
(58) Field of Search ................ 525/422, 420, 525/432, 436; 528/170, 310, 322, 332, 353

(56) References Cited

U.S. PATENT DOCUMENTS

| 3,729,527 | A | | 4/1973 | Nield ..................... 260/857 |
| 5,561,193 | A | * | 10/1996 | Gottshalk et al. ............ 525/63 |
| 5,596,070 | A | | 1/1997 | Gotz ..................... 528/310 |
| 5,639,833 | A | * | 6/1997 | Weber et al. ............... 525/420 |
| 5,739,324 | A | | 4/1998 | Fuchs et al. ................ 540/539 |
| 6,194,538 | B1 | * | 2/2001 | Weiss et al. ................ 528/310 |

FOREIGN PATENT DOCUMENTS

| DE | 2 122 735 | 11/1971 |
| DE | 35 34 817 | 4/1987 |
| DE | 41 02 996 | 8/1992 |
| DE | 43 21 683 | 1/1995 |
| DE | 43 39 648 | 5/1995 |
| DE | 43 30 480 | 2/1996 |
| DE | 197 09 390 | 9/1998 |
| EP | 0 374 988 | 6/1990 |
| EP | 0 479 306 | 4/1992 |
| WO | WO 98/08889 | 3/1998 |

OTHER PUBLICATIONS

McGrath et al. "Polysulfone—Nylon 6 Block Copolymers and Alloys" Polymer Properties (1988) pp. 1032–1039.

Koning et al. "From Incompatable Poly(Aryl Ether Sulfone) Polyamide 4.6 Blends to New Impact Resistant Alloys by a Synergistic Combination of a Block Copolymer Emulsifier and an Impact Modifier" Makromol. Chem. Macromol Symp. vol. 75 (1993) pp. 159–166.

Van Buskirk et al. "Anionic Polymerization and Graft Compolymerization of Caprolactam in an Extruder" Polymer Properties (1988) pp. 557–560.

Schnablegger et al. "Morpholigical and Thermal Investigations of Nylon–6–Poly(Sulfone Ether)–Nylon–6–Triblock Copolymers" Acta Polymer No. 46 (1995) pp. 301–311.

* cited by examiner

Primary Examiner—P. Hampton-Hightower
(74) Attorney, Agent, or Firm—Keil & Weinkauf

(57) ABSTRACT

The process for producing polymer blends by reacting at least one aminonitrile with water in the presence of thermoplastic polymers and optionally further polyamide-forming monomers comprises the following steps:

(1) reacting at least one aminonitrile with water at a temperature from 90 to 400° C. and a pressure from 0.1 to $35 \times 10^6$ Pa to obtain a reaction mixture, (2) further reacting the reaction mixture at a temperature from 150 to 400° C. and a pressure which is lower than the pressure in step 1, the temperature and pressure being selected so as to obtain a first gas phase and a first liquid or a first solid phase or a mixture of first solid and first liquid phase and the first gas phase is separated from the first liquid or the first solid phase or the mixture of first liquid and first solid phase, and (3) admixing the first liquid or the first solid phase or the mixture of first liquid and first solid phase with a gaseous or liquid phase comprising water, which phase may contain thermoplastic polymers and optionally further polyamide-forming monomers, at a temperature from 150 to 370° C. and a pressure from 0.1 to $30 \times 10^6$ Pa to obtain the polymer blend, wherein in one or more of the steps the thermoplastic polymers and optionally further polyamide-forming monomers are added.

6 Claims, No Drawings

METHOD FOR PRODUCING POLYMER MIXTURES COMPRISED OF AMINO NITRILES AND THERMOPLASTIC POLYMERS

BACKGROUND OF THE INVENTION

1. Field of the Invention

The present invention relates to a novel process for producing polymer blends by reacting aminonitriles in the presence of water, thermoplastic polyamides and optionally further polyamide-forming monomers.

Plastics based on single polymers have disadvantages which limit their possible applications. By means of polymer blends it is possible to combine the different properties of the blending partners to improve the property profiles of plastics. This is why, for example, blends of polyamides and amorphous plastics such as polyarylene ether sulfones or polyetherimides are produced.

The polyamides can be produced in a very wide variety of ways. Among the most important methods for producing polyamides is the ring-opening hydrolytic polymerization of lactams. One version of this process, which can also be carried out in industry, is described in DE-A 43 21 683, for example.

2. Description of the Related Art

The production of polyamides from aminonitriles represents an alternative route and makes it possible to utilize other raw materials. For instance, DE-A 197 09 390, an earlier document which was unpublished at the priority date of the present invention, describes continuous and batch processes for producing polyamides from aminonitriles and water at elevated temperature and elevated pressure.

To produce polyamide blends, U.S. Pat. No. 3,729,527 proposes polymerizing $\epsilon$-caprolactam, inter alia, in the presence of polyarylene ether sulfone. DE-A 41 02 996 likewise proposes polymerizing lactams in the presence of amorphous polymers such as polysulfones, polyphenylene ethers, polyetherimides, polyamideimides or styrene copolymers to produce polymer blends. The polymerization is initiated by means of strong bases. The polymerization is initiated by means of strong bases.

BRIEF SUMMARY OF THE INVENTION

If the polymeric blend components are mixed in the melt, for example in an extruder, it is customary to add compatibilizers to them. According to EP-A 0 374 988, McGrath et al., Polym. Prepr. 14, 1032 (1973) or Corning et al., Makromol. Chem. Macromol. Symp. 75, 159 (1993), useful compatibilizers include copolymers composed of polyamide and polyarylene ether sulfone segments, which are produced by dissolving the polyarylene ether sulfone in a lactam melt and polymerizing the lactam in the presence of a strong base and in the absence of water.

DETAILED DESCRIPTION OF THE INVENTION

Studies into the anionic polymerization of lactams in the presence of polyetherimides or polysulfones in an extruder have also been conducted for example by Van Buskirk et al., Polym. Prepr. 29(1), 557 (1988).

All the abovementioned processes utilize lactams or polyamides prepared from lactams for producing blends of polyamides and thermoplastic polymers.

The processes mentioned have the disadvantage that the polymer chains of the thermoplastic polymers are degraded by the attack of the anions present in the reaction mixture. In addition, the anionic polymerization requires special technical measures to control the degree of polymerization, since the reaction is generally very fast and the viscosity increases considerably within a short time. As a consequence, products having a defined structure, i.e., a defined chain length or viscosity, are difficult or impossible to obtain. In addition, the products contain catalyst residues and degradation or by-products which are frequently impossible to remove. If the polymerization is carried out in an extruder, it is frequently impossible to achieve complete conversion and the end product still contains residual monomers. Furthermore, in most cases, the only products obtained are dark, e.g., brown.

Schnablegger et al., Acta Polym. 46,307 (1995) describe the reaction of $\epsilon$-caprolactam with polyarylene ether sulfones which contain aminophenyl end groups. The amino groups react with the $\epsilon$-caprolactam by ring opening and thus initiate the polymerization reaction. The reaction is carried out in the absence of water, and phosphoric acid can be used as a catalyst. The disadvantage of this process is that polyarylene ether sulfones having two aminophenyl end groups per polymer chain are difficult to prepare pure.

It is an object of the present invention to provide an improved process for producing compositions based on different thermoplastic materials and polyamides (polymer blends) without the disadvantages of existing processes.

We have found that this object is achieved according to the invention by a preferably continuous process for producing a polyamide by reacting at least one aminonitrile with water in the presence of thermoplastic polymers and optionally further polyamide-forming monomers, which comprises the following steps:

(1) reacting at least one aminonitrile with water at a temperature from 90 to 400° C. and a pressure from 0.1 to $35 \times 10^6$ Pa, preferably in the presence of a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide, to obtain a reaction mixture, (2) further reacting the reaction mixture at a temperature from 150 to 400° C. and a pressure which is lower than the pressure in step 1, which can be carried out in the presence of a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or first solid phase or a mixture of first solid and first liquid phase and the first gas phase is separated from the first liquid or the first solid phase or the mixture of first liquid and first solid phase, and (3) admixing the first liquid or the first solid phase or the mixture of first liquid and first solid phase with a liquid phase comprising water, which phase may contain the foregoing catalyst, at a temperature from 150 to 370° C. and a pressure from 0.1 to 30×10⁶ Pa to obtain the polymer blend, wherein in one or more of the steps the thermoplastic polymers and optionally further polyamide-forming monomers are added.

The above process preferably additionally comprises the following step:

(4) postcondensing the polymer blend at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polymer blend.

The invention further provides a preferably continuous process for producing polymer blends by reacting at least one aminonitrile with water in the presence of thermoplastic polymers and optionally further polyamide-forming monomers, which comprises the following steps:

(1) reacting at least one aminonitrile with water at a temperature from 90 to 400° C. and a pressure from 0.1 to 35×10⁶ Pa, preferably in the presence of a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide, to obtain a reaction mixture, (2) further reacting the reaction mixture at a temperature from 150 to 400° C. and a pressure which is lower than the pressure in step 1, which can be carried out in the presence of a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide, the temperature and pressure being selected so as to obtain a first gas phase and a first liquid or a first solid phase or a mixture of first solid and first liquid phase and the first gas phase is separated from the first liquid or the first solid phase or the mixture of first liquid and first solid phase, and (3) postcondensing the first liquid or the first solid phase or the mixture of first liquid and first solid phase which can be carried out in the presence of a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide, at a temperature from 200 to 350° C. and a pressure which is lower than the pressure of step 2, the temperature and pressure being selected so as to obtain a second, water- and ammonia-comprising gas phase and a second liquid or second solid phase or a mixture of second liquid and second solid phase, which each comprise the polymer blend, wherein in one or more of the steps the thermoplastic polymers and optionally further polyamide-forming monomers are added.

According to the present invention, the starting materials used are aminonitriles, water, thermoplastic polymers and optionally further polyamide-forming monomers. As well as utilizing aminonitriles as polyamide starting materials, the invention has the advantage that the polymer blends are produced not after the production of polyamides but in the course of the reaction of the aminonitriles, making possible the inexpensive production of finely dispersed blends having improved product properties.

The thermoplastic polymer is preferably added in steps 3 and/or 4. Preferably, no further monomers are present.

The basic method of producing the pure polyamide is described in earlier DE-A-197 09 390, unpublished at the priority date of the present invention.

The aminonitrile in the mixture can be in principle any aminonitrile, i.e., any compound having both at least one amino group and at least one nitrite group. ω-Aminonitriles are preferred, especially ω-aminoalkyl nitriles having from 4 to 12 carbon atoms, more preferably 4 to 9 carbon atoms, in the alkylene moiety, or an aminoalkylaryl nitrile having from 8 to 13 carbon atoms, preferred aminoalkylaryl nitriles being aminoalkylaryl nitriles which have an alkylene group of at least one carbon atom between the aromatic unit and the amino and nitrile group. Especially preferred aminoalkylaryl nitriles are those which have the amino group and nitrile group in the 1,4 position relative to each other.

The ω-aminoalkyl nitrile used is preferably a linear ω-aminoalkyl nitrile in which the alkylene moiety (—$CH_2$—) preferably contains from 4 to 12 carbon atoms, more preferably from 4 to 9 carbon atoms, such as 6-amino-1-cyanopentane (6-aminocapronitrile), 7-amino-1-cyanohexane, 8-amino-1-cyanoheptane, 9-amino-1-cyanooctane, 10-amino-1-cyanononane, particularly preferably 6-aminocapronitrile.

6-Aminocapronitrile is customarily obtained by hydrogenation of adiponitrile according to known methods, described for example in DE-A 836,938, DE-A 848,654 or U.S. Pat. No. 5,151,543.

Of course, it is also possible to use mixtures of a plurality of aminonitriles or mixtures of an aminonitrile with further comonomers, such as caprolactam or the below-defined mixture.

Polyamide-Forming Monomers

Suitable further polyamide-forming monomers include for example dicarboxylic acids, such as alkanedicarboxylic acids having from 6 to 12 carbon atoms, especially from 6 to 10 carbon atoms, such as adipic acid, pimelic acid, suberic acid, azelaic acid or sebacic acid, and also terephthalic acid and isophthalic acid, diamines such as $C_{4-12}$-alkyldiamines, especially having 4 to 8 carbon atoms, such as hexamethyldiamine, tetramethylenediamine or octamethylenediamine, also m-xylylenediamine, bis(4-aminophenyl)methane, 2,2-bis(4-aminophenyl)propane or bis(4-aminocyclohexyl)methane, 2,2-bis(4-aminophenyl) propane or bis(aminocyclohexyl)methane, and also mixtures of dicarboxylic acids and diamines each by itself in any desired combinations, but in relation to one another advantageously in an equivalent ratio to hexamethylenediammonium adipate, hexamethylenediammonium terephthalate or tetramethylenediammonium adipate, preferably hexamethylenediammonium adipate, hexamethylenediammonium terephthalate. Particular industrial importance has been attained by polycaprolactam and polyamides formed from caprolactam, hexamethylenediamine and also adipic acid, isophthalic acid and/or terephthalic acid. A preferred embodiment comprises using ε-caprolactam and hexamethylenediammonium adipate (66 salt).

In a particular embodiment, especially if copolyamides or branched or chain-lengthened polyamides are to be prepared, the following mixture is used instead of pure 6-aminocapronitrile:

from 50 to 99.9, preferably from 80 to 90, % by weight of 6-aminocapronitrile, from 0.01 to 50, preferably from 1 to 30, % by weight of at least one dicarboxylic acid selected from the group consisting of aliphatic $C_4$–$C_{10}$-α-ω-dicarboxylic acids, aromatic $C_8$–$C_{12}$-dicarboxylic acids and $C_5$–$C_8$-cycloalkanedicarboxylic acids, from 0 to 50, preferably from 0.1 to 30, % by weight of an α,ω-diamine having from 4 to 10 carbon atoms, from 0 to 50, preferably from 0 to 30, % by weight of an α,ω-$C_2$–$C_{12}$-dinitrile, and from 0 to 50, preferably from 0 to 30, % by weight of an α,ω-$C_5$–$C_{12}$-amino acid or of the corresponding lactam, from 0 to 10% by weight of at least one inorganic acid or salt thereof, the individual weight percentages adding up to 100%.

Suitable dicarboxylic acids include aliphatic $C_4$–$C_{10}$-α,ω-dicarboxylic acids such as succinic acid, glutaric acid, adipic acid, pimelic acid, suberic acid, azelaic acid, sebacic acid, preferably adipic acid and sebacic acid, particularly preferably adipic acid, and aromatic C8–$C_{12}$-dicarboxylic acids such as terephthalic acid and also $C_5$–$C_8$-cycloalkanedicarboxylic acids such as cyclohexanedicarboxylic acid.

Suitable α,ω-diamines having from 4 to 10 carbon atoms include tetramethylenediamine, pentamethylenediamine, hexamethylenediamine, heptamethylenediamine, octamethylenediamine, nonamethylenediamine and decamethylenediamine, preferably hexamethylenediamine.

It is further also possible to use salts of the aforementioned dicarboxylic acids and diamines, especially the salt of adipic acid and hexamethylenediamine, which is known as 66 salt.

The α,ω-$C_2$–$C_{12}$-dinitrile used is preferably an aliphatic dinitrile such as 1,4-dicyanobutane (adiponitrile), 1,5-dicyanopentane, 1,6-dicyanohexane, 1,7-dicyanoheptane, 1,8-dicyanooctane, 1,9-dicyanononane, 1,10-dicyanodecane, particularly preferably adiponitrile.

If desired, it is also possible to use diamines, dinitriles and aminonitriles derived from branched alkylene or arylene or alkylarylene compounds.

The α,ω-$C_5$–$C_{12}$-amino acid used can be 5-aminopentanoic acid, 6-aminohexanoic acid, 7-aminoheptanoic acid, 8-aminooctanoic acid, 9-aminononanoic acid, 10-aminodecanoic acid, 11-aminoundecanoic acid or 12-aminododecanoic acid, preferably 6-aminohexanoic acid.

The foregoing compounds can also be used in the form of mixtures.

Thermoplastic Polymers

Suitable thermoplastic polymers are all polymers which dissolve in aminonitriles, in mixtures thereof with other polyamide-forming monomers or in reaction mixtures thereof and do not adversely affect their polymerization. According to the invention, dissolution is understood as meaning the preparation of a melt which appears transparent to the observer, i.e., the thermoplastic polymers A may be physically dissolved or present in finely dispersed form.

The suitable amorphous polymers include polyarylene ethers, such as polyarylene ether sulfones or polyphenylene ethers, polyetherimides, polyamidoimides, polystyrene and styrene copolymers, such as styrene/acrylonitrile copolymers, styrene/diene copolymers, elastomeric graft copolymers based on diene or acrylate rubbers, such as ABS (acrylonitrile/butadiene/styrene), ASA (acrylonitrile/styrene/acrylate) or AES (acrylonitrile/ethylene/styrene), or other ethylene copolymers. Mixtures of different polymers A may also be dissolved.

Particularly suitable polyarylene ethers are those of the general formula (I)

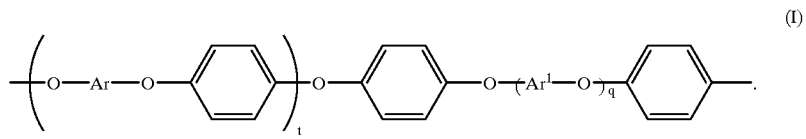

(I)

t and q in the general formula I may each be 0, 1, 2 or 3. T, Q and Z, independently of one another, may be identical or different. They may be a chemical bond or a group selected from —O—, —SO$_2$—, —S—, C=O, —N=N— and S=O. In addition, T, Q and Z may be a group of the general formula —R$^a$C=CR$^b$— or —CR$^c$R$^d$—, where R$^a$ and R$^b$ are each hydrogen or $C_1$–$C_{10}$-alkyl and R$^c$ and R$^d$ are each hydrogen, $C_1$–$C_{10}$-alkyl, such as methyl, ethyl, n-propyl, isopropyl, tert-butyl or n-hexyl, $C_1$–$C_{10}$-alkoxy, such as methoxy, ethoxy, n-propoxy, isopropoxy or n-butoxy, or $C_6$–$C_8$-aryl, such as phenyl or naphthyl. R$^c$ and R$^d$, together with the carbon atom to which they are bonded, may also be linked to form a cycloalkyl ring of 4 to 7 carbon atoms. Preferred among these are cyclopentyl and cyclohexyl. The cycloalkyl rings may be unsubstituted or substituted by one or more, preferably two or three, $C_1$–$C_6$-alkyl groups. The preferred substituents of the cycloalkyl rings include methyl. Polyarylene ethers in which T, Q and Z are each —O—, —SO$_2$—, C=O, a chemical bond or a group of the formula —CR$^c$R$^d$ are preferably used. The preferred radicals R$^c$ and R$^d$ include hydrogen and methyl. Among the groups T, Q and Z, at least one of —SO$_2$— or C=O. If t and q are both 0, Z is then either —SO$_2$— or C=O, preferably —SO$_2$—. Ar and Ar$^1$ are each $C_6$–$C_{18}$-aryl, such as 1,5-naphthyl, 1,6-naphthyl, 2,7-naphthyl, 1,5-anthryl, 9,10-anthryl, 2,6-anthryl, 2,7-anthryl or biphenyl, in particular phenyl. These aryl groups are preferably unsubstituted. However, they may have one or more, for example two, substituents. Suitable substituents are $C_1$–$C_{10}$-alkyl, such as methyl, ethyl, n-propyl, isopropyl, tert-butyl or n-hexyl, $C_6$–$C_8$-aryl, such as phenyl or naphthyl, $C_1$–$C_{10}$-alkoxy, such as methoxy, ethoxy, n-propoxy, isopropoxy or n-butoxy, and halogen. Preferred substituents among these include methyl, phenyl, methoxy and chlorine.
Some suitable repeating units are shown below:
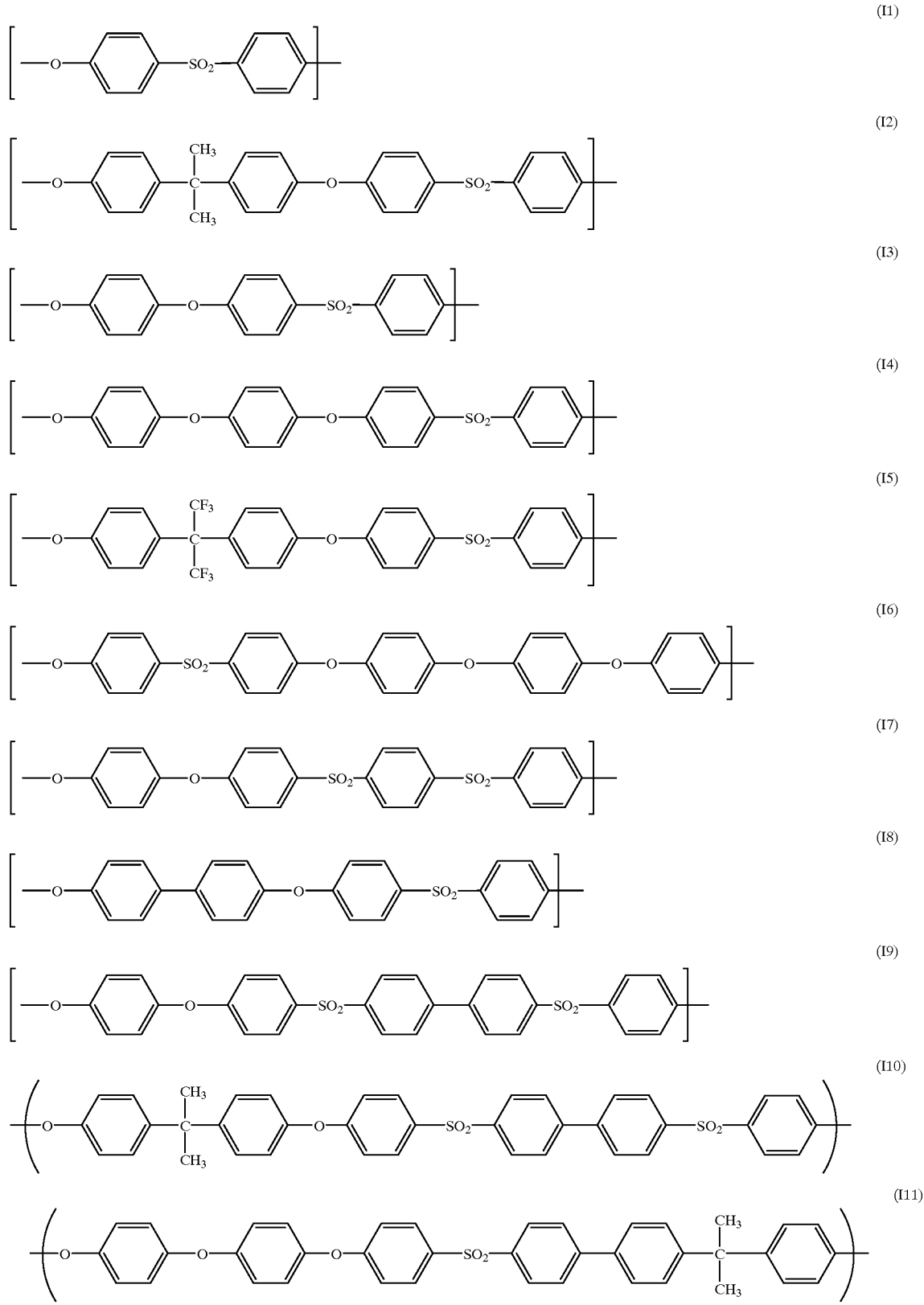

-continued

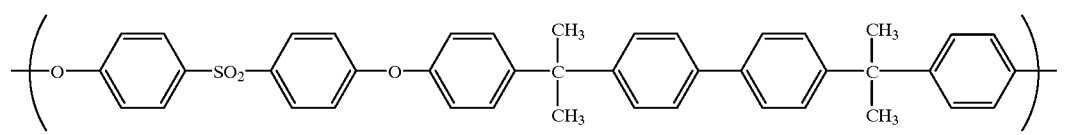

(I12)

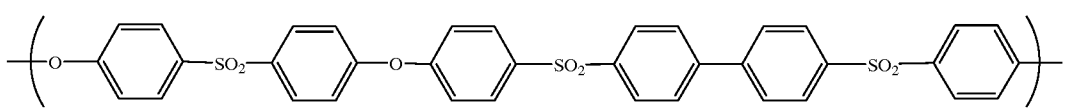

(I13)

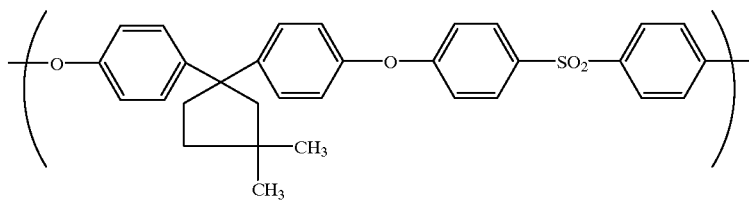

(I14)

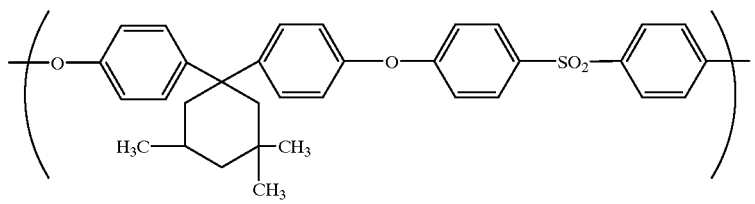

(I15)

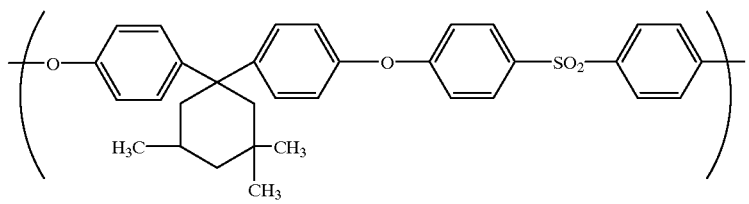

(I16)

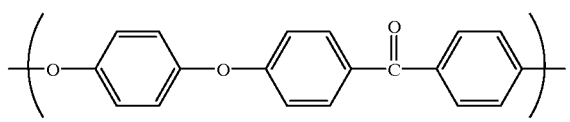

(I17)

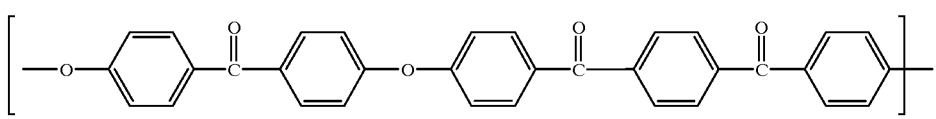

(I18)

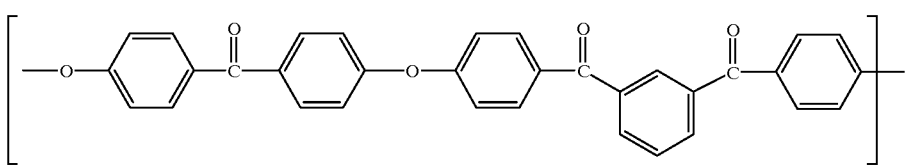

(I19)

Polyarylene ethers having repeating units (I1), (I2) or (I8) are very particularly preferred. These include, for example, polyarylene ethers having from 0 to 100 mol % of repeating units (I1) and from 0 to 100 mol % of repeating units (I2).

The polyarylene ethers may also be copolymers or block copolymers in which polyarylene ether segments and segments of other thermoplastic polymers, such as polyesters, aromatic polycarbonates, polyestercarbonates, polysiloxanes, polyimides or polyetherimides, are present. The number average molecular weights of the blocks or of the grafts in the copolymers are as a rule from 1000 to 30,000 g/mol. The blocks of different structures may be arranged alternately or randomly. The amount by weight of the polyarylene ethers in the copolymers or block copolymers is in general at least 10% by weight and may be up to 97% by weight. Copolymers or block copolymers containing up to 90% by weight of polyarylene ethers are preferred.

Copolymers or block copolymers containing from 20 to 80% by weight of polyarylene ethers are particularly preferred.

Other suitable polyarylene ethers are those which are modified with monomers containing acid or anhydride groups. Such polyarylene ethers can be prepared, for example, starting from the corresponding monomers containing acid and/or anhydride groups. They can also be obtained by grafting these monomers onto the polyarylene ether chain. The suitable acid groups include carboxylic acid, sulfonic acid and phosphonic acid groups. Polyarylene ether sulfones which contain acidic groups distributed either sequentially or randomly over the polymer chain are particularly preferred, it being possible for the acidic groups to be bonded, for example, to the arylene radicals or alkylene intermediate members. For example, polyarylene ether sulfones which are modified with fumaric acid, maleic acid, maleic anhydride or particularly preferably 4,4'-dihydroxyvaleric acid are suitable. Examples of such polyarylene ether sulfones are given in, for example, EP-A-0 185 237.

Mixtures of two or more different polyarylene ether sulfones may also be used.

In general, the polyarylene ethers have number average molecular weights $M_n$ of from 5000 to 60,000 g/mol and relative viscosities of from 0.20 to 0.95 dl/g. Depending on the solubility of the polyarylene ethers, the relative viscosities are measured either in 1% strength by weight N-methylpyrrolidone solution, in mixtures of phenol and dichlorobenzene or in 96% strength sulfuric acid, in each case at 20° C. and 25° C.

Polyarylene ethers having repeating units I are known per se and can be prepared by known methods.

They are formed, for example, by condensation of aromatic bishalogen compounds and the alkali metal double salts of aromatic bisphenols. They can, for example, also be prepared by autocondensation of alkali metal salts of aromatic halophenols in the presence of a catalyst. Polyarylene ethers which contain carbonyl functions are also obtainable by electrophilic (Friedel-Crafts) polycondensation. In the electrophilic polycondensation, the carbonyl bridges are formed either by reacting dicarbonyl chlorides of phosgene with aromatics which contain two hydrogen atoms exchangeable for electrophilic subsituents or by subjecting an aromatic carbonyl chloride which contains both an acid chloride group and a substitutable hydrogen atom to autopolycondensation.

Preferred process conditions for the synthesis of polyarylene ethers are described, for example in EP-A-0 113 112 and EP-A-0 135 130. The reaction of the monomers in aprotic solvents, in particular N-methylpyrrolidone, in the presence of anhydrous alkali metal carbonate, in particular potassium carbonate, is particularly suitable. Reacting the monomers in the melt has also proven advantageous in many cases.

The polyarylene ethers of the general formula I may have as end groups, for example, hydroxyl, chlorine, alkoxy, including preferably methoxy, phenoxy, amino or anhydride or mixtures of the stated end groups.

The thermoplastic polymers A may also be compounds based on substituted, in particular disubstituted, polyphenylene ethers, the etheroxygen of one unit being bonded to the benzene nucleus of the neighboring unit. Polyphenylene ethers substituted in the 2- and/or 6-position relative to the oxygen atom are preferably used. Examples of substituents are halogen, such as chlorine or bromine, long-chain alkyl of up to 20 carbon atoms, such as lauryl and stearyl, and short-chain alkyl of 1 to 4 carbon atoms, which preferably have no α-disposed tertiary hydrogen atom, e.g., methyl, ethyl, propyl or butyl. The alkyl radicals may in turn be monosubstituted or polysubstituted by halogen, such as chlorine or bromine, or by hydroxyl. Further examples of possible sustituents are alkoxy, preferably of 1 up to 4 carbon atoms, or phenyl which is unsubstituted or monosubstituted or polysubstituted by halogen and/or $C_1$–$C_4$-alkyl according to the above definition. Copolymers of different phenols, for example copolymers of 2,6-dimethylphenol and 2,3,6-trimethylphenol, are also suitable. Mixtures of different polyphenylene ethers can of course also be used.

Examples of polyphenylene ethers which may be used according to the invention are poly(2,6-dilauryl-1,4-phenylene ether),
poly(2,6-diphenyl-1,4-phenylene ether),
poly(2,6-dimethoxy-1,4-phenylene ether),
poly(2,6-diethoxy-1,4-phenylene ether),
poly(2-methoxy-6-ethoxy-1,4-phenylene ether),
poly(2-ethyl-6-stearyloxy-1,4-phenylene ether,
poly(2,6-dichloro-1,4-phenylene ether),
poly(2-methyl-6-phenyl-1,4-phenylene ether),
poly(2,6-dibenzyl-1,4-phenylene ether),
poly(2-ethoxy-1,4-phenylene ether),
poly(2-chloro-1,4-phenylene ether),
poly(2,5-dibromo-1,4-phenylene ether).

Preferably used polyphenylene ethers are those which are substituted by alkyl of 1to 4 carbon atoms, e.g., poly(2,6-dimethyl-1,4-phenylene ether),
poly(2,6-diethyl-1,4-phenylene ether),
poly(2-methyl-6-ethyl-1,4-phenylene ether),
poly(2-methyl-6-propyl-1,4-phenylene ether),
poly(2,6-dipropyl-1,4-phenylene ether) and
poly(2-ethyl-6-propyl-1,4-phenylene ether).

For the purposes of the present invention, polyphenylene ethers are also to be understood as meaning those which are modified with monomers, such as fumaric acid, maleic acid or maleic anhydride.

Such polyphenylene ethers are described, inter alia, in WO 87/00540.

Polyphenylene ethers which are used in the compositions are in particular those which have a weight average molecular weight $M_w$ of from about 8000 to 70,000, preferably from about 12,000 to 50,000, in particular from about 20,000 to 49,000.

This corresponds to a limiting viscosity of from about 0.18 to 0.7, preferably from about 0.25 to 0.55, in particular from about 0.30 to 0.50, dl/g, measured in chloroform at 25° C.

The molecular weights of the polyphenylene ethers are determined in general by means of gel permeation chromatography (Schodex® separation columns 0.8×50 cm of Type A 803, A 804 and A 805 with tetrahydrofuran as eluent at room temperature). The polyphenylene ether samples are dissolved in tetrahydrofuran at superatmospheric pressure at 110° C., 0.16 ml of a 0.25% strength by weight solution being injected.

The detection is carried out in general using a UV detector. The columns were calibrated with polyphenylene ether samples whose absolute molecular weight distribution was determined by a GPC/laser light scattering combination.

Other suitable thermoplastic polymers A are polyetherimides or blends of different polyetherimides.

In principle, the polyetherimides used may be either aliphatic or aromatic. Polyetherimides which contain both aliphatic and aromatic groups in the main chain are also suitable. For example, polyetherimides which contain repeating units of the general formula II

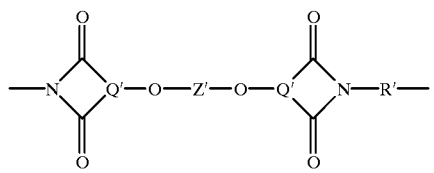

(II)

where Q' is selected, for example, from

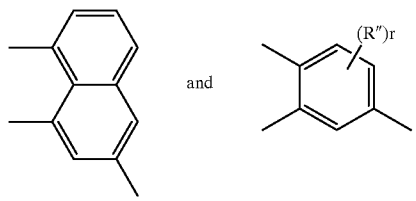

and

Z' and R', independently of one another, may be identical or different, may be used. Z' and R' may, for example, be $C_1$–$C_{30}$-alkylene. The alkylene groups may be either linear or branched or may be closed to form a ring. Examples of these are methylene, ethylene, n-propylene, isopropylene, cyclohexylene and n-decylene. Z' and R' may, however, also be $C_7$–$C_{30}$-alkylarylene. Examples of this are diphenylenemethane, diphenyleneethane and 2,2-diphenylenepropane. Z' and R' may furthermore be $C_6$–$C_{18}$-arylene, such as phenylene or biphenylene. The abovementioned groups may in turn be substituted by one or more sustituents or may be interrupted by heteroatoms or groups of heteroatoms. Particularly preferred substituents are halogens, preferably chlorine or bromine, or $C_1$–$C_{10}$-alkyl, in particular methyl or ethyl. The preferred heteroatoms or groups of heteroatoms, include —$SO_2$—, —O— and —S—. Some suitable radicals Z' and R' are shown below by way of example:

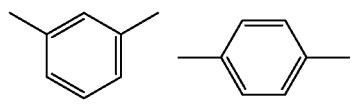

-continued

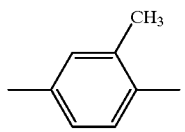

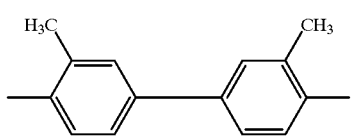

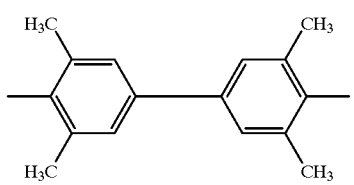

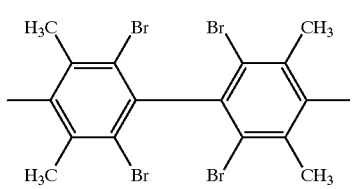

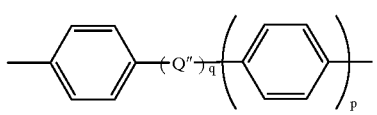

where Q" may be —$C_yH_{2y}$—, —CO—, —$SO_2$—, —O— or —S—, q is 0 or 1, p is 0 or 1 and y is an integer from 1 to 5. R" may be $C_1$–$C_{10}$-alkyl or $C_1$–$C_{10}$-alkoxy and r may be zero or 1. Moreover, the polyetherimides may contain further imide units in addition to the units of the genreal formula II. For example, units of the formulae II1 and II2 or mixtures thereof are suitable:

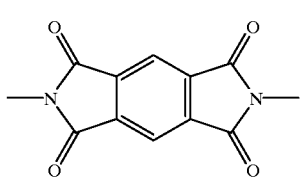

(II1)

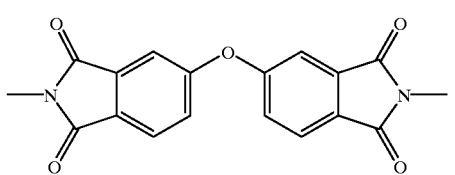

(II2)

Polyetherimides which contain repeating units of the general formula III

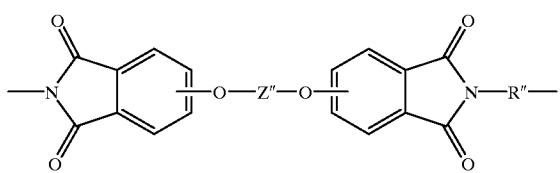
(III)

where Z" and R" have the same meanings as Z' and R', are preferably used.

Particularly preferred polyetherimides contain repeating units in which Z" is

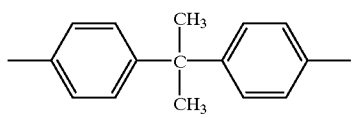

and R" is selected from

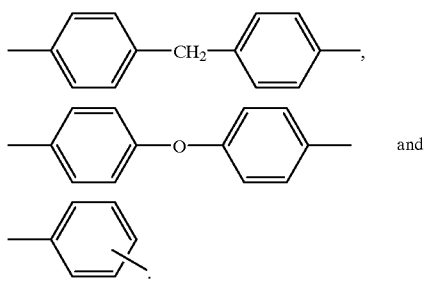

Very particularly preferred polyetherimides contain repeating units of the formula (III1).

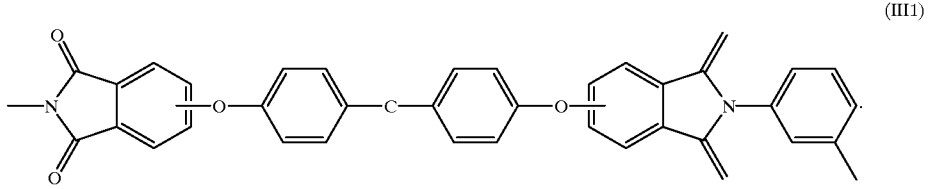
(III1)

The polyetherimides generally have number average molecular weights ($M_n$) of from 5000 to 50,000, preferably from 8000 to 40,000. They are either known or are obtainable by known methods.

Thus, appropriate dianhydrides can be reacted with appropriate diamines to give the poletherimides. As a rule, this reaction is carried out in the absence of a solvent or in an inert solvent at from 100 to 250° C. Particularly suitable solvents are o-dichlorobenzene and m-cresol. The polyetherimides can also be prepared in the melt at from 200 to 400° C., preferably from 230 to 300° C. For the preparation of the polyetherimides, the dianhydrides are generally reacted with the diamines in equimolar ratios. However, a certain molar excess, for example from 0.1 to 5 mol % of dianhydride or diamine, is possible.

According to the invention, polystyrenes may also be used as polymers. Particularly suitable monomers are styrene as well as the styrenes alkylated on the nucleus or side chain. Examples are chlorostyrene, α-methylstyrene, styrene, p-methylstyrene, vinyltoluene and p-tert-butylstyrene. However, styrene alone is preferably used.

The homopolymers are generally prepared by the known mass, solution or suspension methods (cf. Ullmanns Enzyklopädie der techn. Chemie, Volume 19, pages 265 to 272, Verlag Chemie, Weinheim 1980). The homopolymers may have weight average molecular weights $M_w$ of from 100 to 300,000, which can be determined by conventional methods.

In addition, the thermoplastic polymers may be copolymers based on styrene, which are also understood, according to the invention, as meaning copolymers based on other vinylaromatic monomers, such as α-methylstyrene or substituted styrenes, for example $C_1$–$C_{10}$-alkylstyrenes, such as methylstyrene, or mixtures of different vinylaromatic monomers.

For example, styrene copolymers comprising from 50 to 95, preferably from 60 to 80, % by weight of styrene, α-methylstyrene or substituted styrenes, N-phenylmaleimide or mixtures thereof and from 5 to 50, preferably from 20 to 40, % by weight of acrylonitrile, methacrylonitrile, methyl methacrylate, maleic anhydride or mixtures thereof are suitable.

The styrene copolymers are resin-like, thermoplastic and rubber-free. Particularly preferred styrene copolymers are those of styrene with acrylonitrile and, if desired, with methyl methacrylate, of α-methylstyrene with acrylonitrile and, if desired, with methyl methacrylate and of styrene and α-methylstyrene with acrylonitrile and, if desired, with methyl methacrylate and of styrene and maleic anhydride. A plurality of the styrene copolymers described may also be used simultaneously.

These styrene copolymers are known per se and can be prepared by free radical polymerization, in particular emulsion, suspension, solution and mass polymerization. They generally have viscosity numbers of from about 40 to 160, corresponding to weight average molecular weights $M_w$ of from about 40,00 to 2,000,000.

Styrene copolymers of vinylaromatic monomers, for example styrene or α-methylstyrene and conjugated dienes, may also be used in the novel process. A particularly suitable vinylaromatic monomer is styrene. Inter alia, butadiene or isoprene are used as the conjugated diene, butadiene being preferably used. Copolymers which are obtainable by first polymerizing vinylaromatic monomers with conjugated dienes and then subjecting the product to a hydrogenation reaction may also be used as styrene copolymers.

Such styrene copolymers used are obtainable in particular by anionic polymerization of vinylaromatic monomers and conjugated dienes. This gives predominantly block copolymers of these comonomers. Methods for the preparation of such styrene copolymers are generally known (for example, U.S. Pat. No. 3,595,942).

The styrene copolymers used may be of any desired structure, block copolymers having a three-block structure and branched, i.e., star-like, structures having a multiblock structure being particularly preferred. The synthesis of star block copolymers from vinylaromatic monomers and diene monomers is the subject of DE-A 19 59 922 and the synthesis of star block copolymers with multiple initiation is the subject of DE-A 25 50 226 and U.S. Pat. No. 3,639,517.

Suitable monomers and initiators are likewise described in the stated publications. Block copolymers based on styrene as the vinylaromatic monomer and butadiene and/or isoprene as conjugated diene monomers are particularly preferred. The proportion of the vinylaromatic monomers in the styrene copolymers used is in general from 25 to 95, preferably from 40 to 90, % by weight.

The thermoplastic polymers used may furthermore be graft copolymers which are preferably composed of a1) from about 40 to 80, preferably from 50 to 70, % by weight of a grafting base comprising an elastomeric polymer having a glass transition temperature below 0° C., and a2) from about 20 to 60, preferably from 30 to 50, % by weight of a graft layer comprising a21) from about 50 to 95, preferably from 60 to 80, % by weight of styrene or substituted styrenes of the above general formula III or methyl methacrylate or mixtures thereof and a22) from about 5 to 50, preferably from about 20 to 40, % by weight of acrylonitrile, methacrylonitrile, methyl methacrylate, maleic anhydride or mixtures thereof.

Polymers suitable for the grafting base a1) are those whose glass transition temperature is below 10° C., preferably below 0° C., in particular below −20° C. These are, for example, natural rubber, synthetic rubber based on conjugated dienes or mixtures thereof with other copolymers and elastomers based on $C_1$–$C_8$-alkyl esters of acrylic acid, which may contain further comonomers.

Preferred grafting bases a1) are polybutadiene and copolymers of butadiene and styrene.

Further preferred grafting bases a1) are those composed of a11) from 70 to 99.9, preferably from 66 to 79, % by weight of at least one alkyl acrylate where the alkyl radical is of 1 to 8 carbon atoms, preferably n-butyl acrylate and/or 2-ethylhexyl acrylate, in particular n-butyl acrylate as the sole alkyl acrylate, a12) from 0 to 30, preferably from 20 to 30, % by weight of a further copolymerizable, monoethylenically unsaturated monomer, such as butadiene, isoprene, styrene, acrylonitrile, methyl methacrylate and/or vinyl methyl ether and a13) from 0.1 to 5, preferably from 1 to 4, % by weight of a copolymerizable, polyfunctional, preferably bifunctional or trifunctional, monomer which effects crosslinking.

Suitable bifunctional or polyfunctional crosslinking monomers a13) of this type are monomers which preferably contain two, if required also three or more, ethylenic double bonds which are capable of copolymerization and are not conjugated in the 1,3 positions. Examples of suitable crosslinking monomers are divinylbenzene, diallyl maleate, diallyl fumarate, diallyl phthalate, triallyl cyanurate and triallyl isocyanurate. The acrylate of tricyclodecenyl alcohol has proven a particularly advantageous crosslinking monomer (cf. DE-A-12 60 135).

Grafting bases of this type are also known per se and are described in the literature.

Preferred graft layers a2) are those in which a21) is styrene or α-methylstyrene. Preferably used monomer mixtures are in particular styrene and acrylonitrile, α-methylstyrene and acrylonitrile, styrene, acrylonitrile and methyl methacrylate, styrene, N-phenylmaleimide and maleic anhydride. The graft layers are obtainable by copolymerizing the components a21) and a22).

Where the graft copolymer contains a grafting base a1) which is composed of polybutadiene polymers, the term ABS rubber is used.

As known per se, the graft copolymerization can be carried in solution, suspension or, preferably, emulsion. The soft phase of the graft copolymer preferably has an average particle diameter ($d_{50}$ value of the cumulation mass distribution) of 0.08 mm in the preparation of the ABS rubber and the grafting in emulsion. By increasing the size of the particles, for example by agglomeration or by obtaining the emulsion by the seed latex method, the $d_{50}$ value is brought into the range from 0.2 to 0.5 mm. In such graft copolymerizations, at least partial chemical linkage of the polymerizing monomers to the polymerized rubbers takes place, the linkage probably occurring at the double bonds contained in the rubber. At least a part of the monomers is thus grafted onto the rubber, i.e., bonded by covalent bonds to the linear rubber molecules.

The grafting may also be effected in a plurality of stages, by first grafting on a part of the monomers forming the graft shell and then the remainder.

If the grafting base a1) of the graft copolymer is composed of the components a11), if required a12) and a13), the term ASA rubbers is used. Their preparation is known per se or can be carried out by methods known per se.

The graft layer of the graft copolymers can be synthesized in one stage or two stages.

In this case of the one-stage synthesis of the graft layer, a mixture of the monomers a21) and a22) in the desired weight ratio of from 95:5 to 50:50, preferably from 90:10 to 65:35, is polymerized in the presence of the elastomer a1, in a manner known per se, preferably in emulsion.

In the case of a two-stage synthesis of the graft layer a2), the first stage generally accounts for from 20 to 70, preferably from 25 to 50, % by weight, based on a2). Preferably only monoethylenically unsaturated aromatic hydrocarbons (a21) are used for its preparation.

The second stage of the graft layer generally accounts for from 30 to 80, in particular from 50 to 75, % by weight, based in each case on a2). Mixtures of the stated monoethylenically unsaturated aromatic hydrocarbons a21) and monoethylenically unsaturated monomers a22) in a weight ratio a21)/a22) of in general from 90:10 to 60:40, in particular from 80:20 to 70:30, are used for its preparation.

The conditions of the graft copolymerization are preferably chosen so that particle sizes of from 50 to 700 nm ($d_{50}$ value of the integral mass distribution) result. Appropriate measures are known.

A coarse-particled rubber dispersion can be prepared directly by the seed latex method.

In order to obtain very tough products, it is frequently advantageous to use a blend of at least two graft copolymers having different particle sizes.

In order to achieve this, the particle size of the rubber is increased in a known manner, for example by agglomeration, so that the latex has a bimodal composition (e.g., from 50 to 180 nm and from 200 to 700 nm).

Further examples of thermoplastic polymers A are copolymers of α-olefins. The α-olefins are usually monomers of 2 to 8 carbon atoms, preferably ethylene and propylene. Alkyl acrylates or alkyl methacrylates which are derived from alcohols of 1 to 8 carbon atoms, preferably from ethanol, butanol or ethylhexanol, and reactive comonomers, such as acrylic acid, methacrylic acid, maleic acid, maleic anhydride or glycidyl (meth)acrylate and furthermore vinyl esters, in particular vinyl acetate, have proven suitable as comonomers. Mixtures of different comonomers may also be used. Ethylene copolymers with ethyl or butyl acrylate and acrylic acid and/or maleic anhydride as comonomers have proven particularly suitable.

The copolymers can be prepared in a high-pressure process at from 400 to 4500 bar or by grafting the comonomers onto the poly-α-olefin. The amount of the α-olefin in the copolymer is in general from 99.95 to 55% by weight.

Polyamides as Thermoplastic Polymers

Preference is given to adding in step two, three or four of the process, particularly preferably in step three or four, polyamides as thermoplastic polymers, produced from polyamide-forming monomers, such as dicarboxylic acids, such as alkanedicarboxylic acids of 6 to 12, in particular 6 to 10, carbon atoms, such as adipic acid, pimelic acid, suberic acid, azelaic acid or sebacic acid, and terephthalic acid and isophthalic acid, diamines such as $C_4$–$C_{12}$-alkyldiamines, in particular of 4 to 8 carbon atoms, such as hexamethylenediamine, tetramethylenediamine or octamethylenediamine, and m-xylylenediamine , bis-(4-aminophenyl)methane, 2,2-bis(4-aminophenyl)propane or bis(4-aminocyclohexyl)methane, and mixtures of dicarboxylic acids and diamines, each in any desired combinations, but advantageously in an equivalent ratio relative to one another, such as hexamethylenediammonium adipate, hexamethylenediammonium terephthalate or tetramethylenediammonium adipate, preferably hexamethylenediammonium adipate and hexamethylenediammonium terephthalate.

Preference is given in particular to polyamides formed from caprolactam, hexamethylenediamine and also adipic acid, isophthalic acid and/or terephthalic acid.

The process of the invention comprises 3 or 4 steps, and the thermoplastic polymers may be added to the reaction mixture in all steps of the process, whereas further polyamide-forming monomers are preferably added in steps 1 to 3. In addition, further polyamides can be mixed into the polymer mixture preferably in steps three and four.

In general, from 30 to 100, preferably from 35 to 100, % by weight, based on the total amount of monomers (polyamide-forming monomers b and aminonitriles), of aminonitriles and from 0 to 70, preferably from 0 to 65, % by weight, based on the total amount of monomers, of the further polyamide-forming monomers are used. The 66 salt is usually used as an aqueous solution whose concentration is in general from 30 to 75, preferably from 35 to 70, % by weight, based on the aqueous solution. As a rule, the weight ratio of aminonitriles to 66 salt is chosen in the range from 4:1 to 20:1, preferably from 5:1 to 15:1.

The thermoplastic polymer content of the reaction mixture is generally within the range from 1 to 75% by weight of the solution. Accordingly, the portion of the sum total of the aminonitriles and polyamide-forming monomers is within the range from 25 to 99% by weight. Preferably, the mixture comprises from 2 to 75%, especially from 3 to 70%, by weight of thermoplastic polymers and from 25 to 98%, especially from 30 to 97%, by weight of the total amount of aminonitriles and polyamide-forming monomers.

According to the invention, the first step (step 1) involves heating at least one aminonitrile with water at a temperature from about 90 to about 400° C., preferably about 180 to about 310° C., especially about 220 to about 270° C., to which a pressure from about 0.1 to about $15 \times 10^6$ Pa, preferably about 1 to about $10 \times 10^6$ Pa, especially about 4 to about $9 \times 10^6$ Pa, is set. In this step, the pressure and the temperature can be adjusted relative to each other in such a way as to obtain a liquid or a solid phase and a mixture of liquid or solid phase and a gaseous phase.

Depending on the melting point of the polyamide-forming monomers, the thermoplastic polymers are dissolved in aminonitrile and further polyamide-forming monomers at temperatures within the range from 50 to 300° C., preferably within the range from 80 to 190° C. To obtain very thorough mixing of the constituents of the solution, the mixtures are advantageously stirred. Stirred tanks are suitable for this purpose, for example. In general, the water is then added all at once, a little at a time or continuously. The temperature of the solution is either simultaneously or subsequently raised, generally to 180–330° C., preferably to 220° C.–310° C. The solution can either remain in the apparatus in which it was produced or—especially in the case of a continuous reaction—be transferred to another reaction vessel before or after the heating or before or after the addition of water.

According to the invention, water is used in a molar ratio of aminoalkyl nitrile to water within the range from 1:1 to 1:30, particularly preferably within the range from 1:2 to 1:8, very particularly preferably within the range from 1:2 to 1:6, preference being given to the use of water in excess, based on the aminoalkyl nitrile used.

In this embodiment, the liquid or solid phase or the mixture of liquid and solid phase corresponds to the reaction mixture, whereas the gaseous phase is separated off. As part of this step, the gaseous phase can be separated from the liquid or solid phase or from the mixture of solid or liquid phase at once, or the synthesis mixture forming within this step can be present in two-phase form: liquid/gaseous, solid/gaseous or liquid-solid/gaseous. Of course, the pressure and temperature can also be adjusted relative to each other in such a way that the synthesis mixture is present as a single solid or liquid phase.

The removal of the gas phase can be effected by the use of stirred or unstirred separating tanks or tank batteries and by the use of evaporator apparatus, for example by means of circulatory evaporators or thin-film evaporators, as, for example, by film extruders, or by means of annular disk reactors, which ensure an enlarged phase interface. In certain cases, recirculation of the synthesis mixture or the use of a loop reactor may be necessary to increase the phase interface. Furthermore, the removal of the gas phase can be furthered by the addition of water vapor or inert gas into the liquid phase.

Preferably, the pressure is adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

The two-phase procedure is preferably carried out at a pressure which is greater than the vapor pressure of pure water belonging to the temperature of the reaction mixture, but less than the equilibrium vapor pressure of ammonia.

Step 1 can be carried out in stirred tanks, flow pipes or tank batteries. A two-phase procedure is preferably carried out using tanks or a reaction column, whereas a procedure involving a single liquid phase is preferably carried out using a packed flow pipe. The use of a tube bundle reactor, selectively packed, in the first process step is likewise possible and advantageous, for a two-phase procedure especially, to improve the heat transfer and to further reduce the axial back-mixing of the reactants.

Usable packing elements include, for example, Raschig rings or Sulzer mixing elements in order that a narrow residence time distribution may be ensured and in order that back-mixing may be limited.

In a further embodiment, the reactor of the first step is subjected to a downward flow regime, in which case it is again preferably equipped with packing elements which limit any axial back-mixing of the reactants. As a result, the ammonia gas liberated in the reactor, predominantly directly after entry into the reactor, reaches the gas phase at the top of the reactor by the most direct route. Interference caused to the flow profile in the further course of the reactor by ascending gas bubbles or convection is therefore minimal.

In a particularly preferred embodiment of the two-phase procedure, a vertical flow pipe is subjected to upward flow and has a further opening for gas phase removal above the product outlet. This tubular reactor can be partially or completely packed with catalyst granules. In a preferred embodiment, the upright reactor used in the two-phase process is packed with catalyst material maximally up to the phase limit.

In another, particularly preferred embodiment of the first step, the pressure is selected so that the reaction mixture is present as a single liquid phase, i.e., there is no gas phase present in the reactor. In this single-phase procedure, the preferred embodiment is a flow pipe packed exclusively with catalyst material.

In a further preferred embodiment, the aminonitrile/water mixture is continuously heated with the aid of a heat exchanger and the mixture thus heated is introduced together with thermoplastic polymers and polyamide-forming monomers into a reaction vessel heated to the same temperature, preferably into a tube which, if desired, may contain internals such as Sulzer mixing elements to avoid back-mixing. Of course, the aminonitrile/water mixture can also be heated up separately from the thermoplastic polymers and further monomers and subsequently be mixed in the reactor.

As regards the residence time of the synthesis mixture in the first step, there are no restrictions whatsoever; however, it is generally set within the range from about 10 minutes to about 10 hours, preferably within the range from about 10 minutes to about 6 hours.

Although there are no restrictions whatsoever concerning the degree of conversion of nitrile groups in step 1 either, economic reasons especially dictate that the conversion of nitrile groups in step 1 be generally not less than about 70 mol %, preferably at least about 95 mol %, and especially within the range from about 97 to about 99 mol %, based in each case on the moles of aminonitrile used.

The nitrile group conversion is customarily determined by means of IR spectroscopy (CN stretching vibration at 2247 wavenumbers), Raman spectroscopy, NMR or HPLC, preferably by IR spectroscopy.

Nor does the invention rule out conducting the reaction in step 1 (and the other steps, specifically steps 2 and/or 3) in the presence of oxygen-containing phosphorus compounds, especially phosphoric acid, phosphorous acid and hypophosphorous acid and their alkali metal and alkaline earth metal salts and ammonium salts such as $Na_3PO_4$, $NaH_2PO_4$, $Na_2HPO_4$, $NaH_2PO_3$, $Na_2HPO_3$, $NaH_2PO_2$, $K_3PO_4$, $KH_2PO_4$, $K_2HPO_4$, $KH_2PO_3$, $K_2HPO_3$, $KH_2PO_2$, in which case the molar ratio of α-aminonitrile to phosphorus compounds is selected within the range from 0.01:1 to 1:1, preferably within the range from 0.01:1 to 0.1:1. In addition, a below-described catalyst can be used.

The reaction in step 1 can be carried out in a flow pipe containing a Brönsted acid catalyst selected from a beta-zeolite catalyst, a sheet-silicate catalyst or a titanium dioxide catalyst comprising from 70 to 100% by weight of anatase and 0–30% by weight of rutile and in which up to 40% by weight of the titanium dioxide may be replaced by tungsten oxide. If very pure aminonitrile is used, the proportion of anatase in the titanium dioxide catalyst should be as high as possible. Preferably, a pure anatase catalyst is used. If the aminonitrile used contains impurities, for example from 1 to 3% by weight of impurities, preference is given to using a titanium dioxide catalyst comprising a mixture of anatase and rutile. Preferably, the proportion of anatase is within the range from 70 to 80% by weight and the proportion of rutile within the range from 20 to 30% by weight. Particularly preferably, in this case, a titanium dioxide catalyst composed of about 70% by weight of anatase and about 30% by weight of rutile is used. The catalyst preferably has a pore volume of from 0.1 to 5 ml/g, particularly preferably from 0.2 to 0.5 ml/g. The average pore diameter is preferably within the range from 0.005 to 0.1 mm, particularly preferably within the range from 0.01 to 0.06 mm. If highly viscous products are used, the average pore diameter should be large. The cutting hardness is preferably greater than 20 N, particularly preferably >25 N. The BET surface area is preferably more than 40 $m^2$/g, particularly preferably more than 100 $m^2$/g. If the BET surface area is smaller, the bed volume should be appropriately higher to ensure adequate catalyst activity. Particularly preferred catalysts have the following properties: 100% of anatase; 0.3 ml/g pore volume; 0.02 mm average pore diameter; 32 N cutting hardness; 116 $m^2$/g BET surface area or 84% by weight of anatase; 16% by weight of rutile; 0.3 ml/g pore volume; 0.03 mm average pore diameter; 26 N cutting hardness; 46 m$^2$/g BET surface area. The catalysts may be prepared from commercial powders as available for example from Degussa, Finnti or Kemira. When tungsten oxide is used, up to 40% by weight, preferably up to 30% by weight, particularly preferably from 15 to 25% by weight of the titanium dioxide is replaced by tungsten oxide. The catalysts can be prepared as described in Ertl, Knözinger, Weitkamp: "Handbook of heterogeneous catalysis", VCH Weinheim, 1997, pages 98ff. The catalyst can be used in any desired suitable form. It is preferably used in the form of moldings, extrudates, granules, coated packings or internals, especially in the form of granules. The granules are preferably sufficiently large to be readily separable from the product mixture and not to impair the flowability of the product during the reaction.

The granular form of the catalyst makes it possible to remove it mechanically at the point of exit from the first step. To this end, mechanical filters or sieves are provided at the point of exit from the first step, for example. If the catalyst is additionally used in the second and/or third steps, it is preferably in the same form.

According to the invention, the reaction mixture obtained in the first step is further reacted in step 2 at a temperature from about 200(150) to about 350 (400)° C., preferably at a temperature within the range from about 210(200) to about 300(330)° C., especially within the range from about 230 (230) to about 270 (290)° C., and a pressure which is lower than the pressure in step 1. The pressure in the second step is preferably at least about 0.5×10$^6$ Pa lower than the pressure in step 1, and generally the pressure will be within the range from about 0.1 to about 45×10$^6$ Pa, preferably within the range from about 0.5 to about 15×10$^6$ Pa, especially within the range from about 2 to about 6×10$^6$ Pa (parenthical values: no catalyst).

In step 2, the temperature and the pressure are chosen so as to obtain a first gas phase and a first liquid or first solid phase or a mixture of first liquid and first solid phase and the first gas phase is separated from the first liquid or first solid phase or from the mixture of first liquid and first solid phase.

The first gaseous phase, which consists essentially of ammonia and water vapor, is generally removed continuously by means of a distillation apparatus, such as a distillation column. Any organic constituents of the distillate coremoved in the course of this distillation, predominantly unconverted aminonitrile, can be wholly or partly recycled into step 1 and/or step 2.

The residence time of the reaction mixture in step 2 is not subject to any restrictions whatsoever, but is generally within the range from about 10 minutes to about 5 hours, preferably within the range from about 30 minutes to about 3 hours.

The product line between the first and second steps optionally contains packing elements, for example Raschig rings or Sulzer mixing elements, which facilitate a controlled expansion of the reaction mixture into the gas phase. This applies to the one-phase procedure especially.

If desired, the reaction mixture of the 1st step may have metered into it further thermoplastic polymers and/or polyamide-forming monomers, preferably continuously and in the liquid phase.

Preferably, the reactor of the second step contains the catalyst material of the invention too, especially in granule form. It was found that, compared with a catalyst-free reactor, the reactor permits a further improvement in the product properties, especially at comparatively high pressures and/or in the event of a large water excess in the reaction mixture. Temperature and pressure should be selected so as to keep the viscosity of the reaction mixture sufficiently low to avoid the catalyst surface coming clogged. According to the invention, the point of exit from the second process step too is equipped with sieves or filters which guarantee the purity of the reaction mixture and separate the catalyst from the reaction mixture.

In step 3, the first liquid or the first solid phase or the mixture of first liquid and first solid phase is admixed with a gaseous or liquid phase comprising an aqueous medium, preferably with water or water vapor, at a temperature from about 90 to about 400° C., preferably from about 180 to about 310° C., especially from about 220 to about 270° C., the pressure set being from about 0.1 to about 15×10$^6$ Pa, preferably about 1 to about 10×10$^6$ Pa, especially from about 4 to about 9×10$^6$ Pa. This is preferably done continuously. The amount of water added (as liquid) is preferably within the range from about 50 to about 1500 ml, more preferably within the range from about 100 to about 500 ml, based in each case on 1 kg of the first liquid or first solid phase or of the mixture of first liquid and first solid phase, provided no thermoplastic polymer is added. This addition of water primarily compensates the water losses incurred in step 2 and furthers the hydrolysis of acid amide groups in the synthesis mixture. This results in a further advantage of this invention, that the mixture of the starting materials as used in step 1 can be used with a small excess of water only.

If thermoplastic polymers and polyamide-forming monomers are added to step 3, as well as water, then the amount of water added depends on the water-solubility and the amount of thermoplastic polymers added. Depending on the melting point of the components used, the thermoplastic polymers and the monomers are converted into the liquid phase and brought to the required temperature and, if desired, mixed with water. To obtain very thorough mixing, the mixtures are advantageously stirred. Stirred tanks are suitable for this purpose, for example. The solution is then preferably brought to the required reaction temperature of the third process step and then mixed with the first liquid or the first solid phase or the mixture of first solid and first liquid phase. For this, the reactor may optionally be fitted with mixing elements which further the mixing of the components.

Step 3 can be operated at a temperature from 150 to 370° C. and a pressure from 0.1 to 30×10$^6$ Pa. If a catalyst bed according to the invention is present, the conditions applying to step 1 may be employed. The temperature is otherwise preferably from 180 to 300° C., particularly preferably from 220 to 280° C. The pressure is preferably from 1 to 10×10$^6$ Pa, particularly preferably from 2×10$^6$ to 7×10$^6$ Pa.

The pressure and temperature can be adjusted to each other in such a way that the synthesis mixture is present as a single liquid or solid phase. In another embodiment, the pressure and temperature are selected so that a liquid or a solid phase or a mixture of solid and liquid phase and also a gaseous phase are obtained. In this embodiment, the liquid or solid phase or the mixture of liquid and solid phase corresponds to the product mixture, whereas the gaseous phase is separated off. As part of this step, the gaseous phase can be separated from the liquid or solid phase or from the mixture of solid or liquid phase at once, or the synthesis mixture forming within this step can be present in two-phase form: liquid/gaseous, solid/gaseous or liquid-solid/gaseous.

The pressure can be adjusted at a preselected temperature so that the pressure is smaller than the equilibrium vapor pressure of ammonia, but greater than the equilibrium vapor pressure of the other components in the synthesis mixture at the given temperature. This way, it is possible to favor especially the removal of ammonia and thus speed up the hydrolysis of the acid amide groups.

The apparatus/reactors usable in this step can be identical with those of step 1, as discussed above.

The residence time of this step is likewise not subject to any restrictions, but economic reasons generally dictate a range from about 10 minutes to about 10 hours, preferably from about 60 to about 8 hours, particularly preferably from about 60 minutes to about 6 hours.

The product mixture obtained in step 3 can be further procurred as described below.

In a preferred embodiment, the product mixture of step 3 is subjected to a postcondensation in a fourth step at temperatures from about 200 to about 350° C., preferably at temperatures from about 220 to 300° C., especially from about 240 to 270° C. Step 4 is carried out at a pressure which is below the pressure of step 3 and is preferably within the range from about 5 to $1000 \times 10^3$ Pa, more preferably within the range from about 10 to about $300 \times 10^3$ Pa. In the context of this step, the temperature and pressure are selected so as to obtain a second gas phase and a second liquid or solid phase or a mixture of second liquid and second solid phase which each comprise the polyamide.

According to the invention, the reaction of the reaction mixture in the fourth step can likewise be carried out in the presence of newly added thermoplastic polymers. Depending on the melting point, the thermoplastic polymers are transferred into the liquid phase at temperatures within the range from 50 to 300° C., preferably within the range from 80 to 290° C. Stirred tanks are suitable here as feed tanks, for example. The solution is then preferably heated to the required reaction temperature of the fourth process step and then mixed together with the liquid or the solid phase of the mixture of solid and liquid phase of the reaction effluent from the third or second reaction step. Mixing elements may be used to further the mixing of the components. In another embodiment, the thermoplastic polymers, in liquid or solid form, are introduced into the fourth step reactor separately from the product effluent of the third step and mixed therein, for example with the aid of a stirrer.

The postcondensation of step 4 is preferably carried out in such a way that the relative viscosity (measured at a temperature of 25° C. and a concentration of 1 g of polymer per 100 ml in 96% strength by weight of sulfuric acid) of the polyamide assumes a value within the range from about 1.6 to about 3.5.

In a preferred embodiment, any water present in the liquid phase can be expelled by means of an inert gas such as nitrogen.

The residence time of the reaction mixture in step 4 depends especially on the desired relative viscosity, the temperature, the pressure and the amount of water added in step 3.

If step 3 is operated as a single-phase regime, the product line between step 3 and step 4 may optionally contain packing elements, for example Raschig rings or Sulzer mixing elements, which allow a controlled expansion of the synthesis mixture in the gas phase.

The fourth step too can be operated with the catalyst of the invention. It was found that the use of the catalyst in process step 4 will improve the molecular weight buildup especially when the relative viscosity of the effluent from the third or—in the case of the three-step procedure—second step is less than RV=1.6—and/or the molar nitrile group and acid amide content in the polymer is greater than 1%, each based on the number of moles of aminonitrile used.

In a further embodiment of the invention, step 3 may be dispensed with and the polyamide produced by carrying out steps (1), (2) and (4).

The above-described processes, i.e., the sequence according to the invention of steps (1) to (3) or (1), (2) and (4) or (1) to (4), can be carried out batchwise, i.e., in succession in a single reactor, or continuously, i.e., simultaneously in successive reactors. It is also possible, of course, to carry out some of these steps, for example steps (1) and (2), continuously and the remaining step(s) batchwise.

In a further preferred embodiment of the present invention, at least one of the gas phases obtained in the respective steps can be recycled into at least one of the preceding steps.

It is further preferable to select the temperature and pressure in step 1 or in step 3 or in both step 1 and step 3 so as to obtain a liquid or a solid phase or a mixture of liquid and solid phase and a gaseous phase and to separate off the gaseous phase.

According to the invention, all the steps where polymers are present must be carried out with thorough mixing of the polymers and monomers ensured. In steps 2 and 4 especially, the use of apparatus, for example stirrers, which ensures pronounced shearing of the reaction mixture is particularly preferred.

Furthermore, in the context of the process of the invention, it is also possible to carry out a chain lengthening or branching or a combination thereof. For this purpose, polymer branching or chain-lengthening substances known to a person skilled in the art are added in the individual steps. These substances are preferably added in step 3 or 4.

Usable Substances Are:

Trifunctional amines or carboxylic acids as branching agents or crosslinkers. Examples of suitable at least trifunctional amines or carboxylic acids are described in EP-A-0 345 648. The at least trifunctional amines have at least three amino groups which are capable of reaction with carboxylic acid groups. They preferably do not have any carboxylic acid groups. The at least trifunctional carboxylic acids have at least three carboxylic acid groups which are capable of reaction with amines and which can also be present, for example, in the form of their derivatives, such as esters. The carboxylic acids preferably do not contain any amino groups capable of reaction with carboxylic acid groups. Examples of suitable carboxylic acids are trimesic acid, trimerized fatty acids, prepared for example from oleic acid and having from 50 to 60 carbon atoms, naphthalenepolycarboxylic acids, such as naphthalene-1,3,5,7-tetracarboxylic acid. The carboxylic acids are preferably defined organic compounds and not polymeric compounds.

Examples of amines having at least 3 amino groups are nitrilotrialkylamine, especially nitrilotriethaneamine, dialkylenetriamines, especially diethylenetriamine, trialkylenetetramines and tetraalkylenepentamines, the alkylene moieties preferably being ethylene moieties. Furthermore, dendrimers can be used as amines. Dendrimers preferably have the general formula I

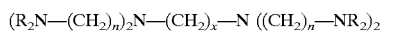

$$(R_2N-(CH_2)_n)_2N-(CH_2)_x-N\,((CH_2)_n-NR_2)_2 \qquad (I)$$

where

R is H or —$(CH_2)_n$—$NR^1{}_2$, where
$R^1$ is H or —$(CH_2)_n$—$NR^2{}_2$, where
$R^2$ is H or —$(CH_2)_n$—$NR^3{}_2$, where
$R^3$ is H or —$(CH_2)_n$—$NH_2$,
n is an integer from 2 to 6, and
x is an integer from 2 to 14.

Preferably, n is 3 or 4, especially 3, and x is an integer from 2 to 6, preferably from 2 to 4, especially 2. The radicals R can also have the stated meanings independently of one another. Preferably, R is a hydrogen atom or a —$(CH_2)_n$—$NH_2$ radical.

Suitable carboxylic acids are those having from 3 to 10 carboxylic acid groups, preferably 3 or 4 carboxylic acid groups. Preferred carboxylic acids are those having aromatic and/or heterocyclic nuclei. Examples are benzyl, naphthyl, anthracene, biphenyl, triphenyl radicals or heterocycles such as pyridine, bipyridine, pyrrole, indole, furan, thiophene, purine, quinoline, phenanthrene, porphyrin, phthalocyanin, naphthalocyanin. Preference is given to 3,5,3',5'-biphenyltetracarboxylic acidphthalocyanine, naphthalocyanine, 3,5,5',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, particularly preferably 1,3,5-benzenetricarboxylic acid (trimesic acid) and 1,2,4,5-benzenetetracarboxylic acid. Such compounds are commercially available or can be prepared by the process described in DE-A-43 12 182. If ortho-substituted aromatic compounds are used, imide formation is preferably prevented through the choice of suitable reaction temperatures.

These substances are at least trifunctional, preferably at least tetrafunctional. The number of functional groups can be from 3 to 16, preferably from 4 to 10, particularly preferably from 4 to 8. The processes of the invention are carried out using either at least trifunctional amines or at least trifunctional carboxylic acids, but not mixtures of such amines or carboxylic acids. However, small amounts of at least trifunctional amines may be present in the trifinctional carboxylic acids, and vice versa.

The substances are present in an amount from 1 to 50 mmol/g of polyamide, preferably from 1 to 35, particularly preferably from 1 to 20, $\mu$mol/g of polyamide. The substances are preferably present in an amount from 3 to 150, particularly preferably from 5 to 100, especially from 10 to 70, mmol of equivalents/g of polyamide. The equivalents are based on the number of functional amino groups or carboxylic acid groups.

Difunctional carboxylic acids or difunctional amines are used as chain lengtheners. These have 2 carboxylic acid groups which can be reacted with amino groups, or 2 amino groups which can be reacted with carboxylic acids. The difunctional carboxylic acids or amines, as well as the carboxylic acid groups or amino groups, do not contain any further functional groups capable of reaction with amino groups or carboxylic acid groups. Preferably, they do not contain any further functional groups. Examples of suitable difunctional amines are those which form salts with difunctional carboxylic acids. They can be linear aliphatic, such as $C_{1-4}$-alkylenediamine, preferably $C_{2-6}$-alkylenediamine, for example hexylenediamine. They can also be cycloaliphatic. Examples are isophoronediamine, dicycycan, laromine. Branched aliphatic diamines are likewise usable, an example being Vestamin TMD (trimethylhexamethylenediamine, from Hüls AG). In addition, they can be diamines. Entire amines can each be substituted by $C_{1-12}$-alkyl, preferably $C_{1-14}$-alkyl, radicals on the carbon skeleton.

Difunctional carboxylic acids are for example those which form salts with difunctional diamines. They can be linear aliphatic dicarboxylic acids, which are preferably $C_{4-20}$-dicarboxylic acids. Examples are adipic acid, azelaic acid, sebacic acid, suberic acid. They can also be aromatic. Examples are isophthalic acid, terephthalic acid, naphthalenedicarboxylic acid, as well as dimerized fatty acids.

The difunctional basic building blocks are preferably used in amounts from 1 to 55, particularly preferably from 1 to 30, especially from 1 to 15, mm/g of polyamide.

According to the invention, the product mixture obtained in step 3, or the second liquid or second solid phase or the mixture of second liquid and second solid phase (from step 4) which each comprise the polyamide, preferably a polymer melt, is discharged from the reaction vessel in a conventional manner, for example by means of a pump. Subsequently, the polyamide obtained can be worked up according to conventional methods, as described for example in DE-A 43 21 683 (page 3 line 54 to page 4 line 3) at length.

In a preferred embodiment, the level of cyclic dimer in the nylon-6 obtained according to the invention can be further reduced by extracting the polyamide first with an aqueous solution of caprolactam and then with water and/or subjecting it to a gas phase extraction (described in EP-A-0 284 968, for example). The low molecular weight constituents obtained in this aftertreatment, such as caprolactam, linear caprolactam oligomer and cyclic caprolactam oligomer, can be recycled into the first and/or second and/or third step.

The starting mixture and the synthesis mixture can be admixed in all steps with chain regulators such as aliphatic and aromatic carboxylic and dicarboxylic acids and catalysts such as oxygen-containing phosphorus compounds in amounts within the range from 0.01 to 5% by weight, preferably within the range from 0.2 to 3% by weight, based on the amount of polyamide-forming monomers and aminonitriles used. Suitable chain regulators include, for example, propionic acid, acetic acid, benzoic acid, terephthalic acid and triacetonediamine.

Additives and fillers such as pigments, dyes and stabilizers are generally added to the synthesis mixture prior to pelletization, preferably in the second, third and fourth step. Particular preference is given to using fillers and additives whenever the synthesis or polymer mixture will not encounter fixed bed catalysts in the rest of the processing. One or more impact-modified rubbers may be present in the compositions as additives in amounts from 0 to 40% by weight, preferably from 1 to 30% by weight, based on the entire composition.

It is possible to use, for example, customary impact modifiers which are suitable for polyamides and/or polyarylene ethers.

Rubbers which enhance the toughness of polyamides generally have two essential features: they have an elastomeric portion which has a glass transition temperature of less than $-10°$ C., preferably less than $-30°$ C., and they contain at least one functional group which is capable of interaction with the polyamide. Suitable functional groups include, for example, carboxylic acid, carboxylic anhydride, carboxylic ester, carboxylic amide, carboxylic imide, amino, hydroxyl, epoxide, urethane and oxazoline groups.

Examples of rubbers which enhance the toughness of the blends include:

EP and EPDM rubbers grafted with the above functional groups. Suitable grafting reagents include for example maleic anhydride, itaconic acid, acrylic acid, glycidyl acrylate and glycidyl methacrylate.

These monomers can be grafted onto the polymer in the melt or in solution, in the presence or absence of a free-radical initiator such as cumene hydroperoxide.

The copolymers of α-olefins described under the polymers, including especially the ethylene copolymers, may also be used as rubbers instead of polymers A and be mixed as such into the compositions of the invention.

A further group of suitable elastomers are core-shell graft rubbers. These are graft rubbers which are produced in emulsion and which have at least one hard and one soft constituent. A hard constituent is customarily a polymer having a glass transition temperature of at least 25° C., while a soft constituent is a polymer having a glass transition temperature of not more than 0° C. These products have a structure made up of a core and at least one shell, the structure being the result of the order in which the monomers are added. The soft constituents are generally derived from butadiene, isoprene, alkyl acrylates, alkyl methacrylates or siloxanes and optionally further comonomers. Suitable siloxane cores can be prepared for example starting from cyclic oligomeric octamethyltetrasiloxane or tetravinyltetramethyltetrasiloxane. These can be for example reacted with γ-mercaptopropylmethyldimethoxysilane in a ring-opening cationic polymerization, preferably in the presence of sulfonic acids, to form the soft siloxane cores. The siloxanes can also be crosslinked by, for example, conducting the polymerization reaction in the presence of silanes having hydrolyzable groups such as halogen or alkoxy groups such as tetraethoxysilane, methyltrimethoxysilane or phenyltrimethoxysilane. Suitable comonomers here include for example styrene, acrylonitrile and crosslinking or grafting monomers having more than one polymerizable double bond such as diallyl phthalate, divinylbenzene, butanediol diacrylate or triallyl (iso)cyanurate. The hard constituents are generally derived from styrene, α-methylstyrene and copolymers thereof, preferred comonomers being acrylonitrile, methacrylonitrile and methyl methacrylate.

Preferred core-shell graft rubbers have a soft core and a hard shell or a hard core, a first soft shell and at least one further hard shell. The incorporation of functional groups such as carbonyl, carboxylic acid, acid anhydride, acid amide, acid imide, carboxylic esters, amino, hydroxyl, epoxy, oxazoline, urethane, urea, lactam or halobenzyl groups is here preferably effected by the addition of suitably functionalized monomers during the polymerization of the last shell. Suitable functionalized monomers include for example maleic acid, maleic anhydride, mono or diesters of maleic acid, tert-butyl (meth)acrylate, acrylic acid, glycidyl (meth)acrylate and vinyloxazoline. The proportion of monomers having functional groups is generally within the range from 0.1 to 25% by weight, preferably within the range from 0.25 to 15% by weight, based on the total weight of the core-shell graft rubber. The weight ratio of soft to hard constituents is generally within the range from 1:9 to 9:1, preferably within the range from 3:7 to 8:2.

Such rubbers, which enhance the toughness of polyamides, are known per se and described in EP-A-0 208 187 for example.

A further group of suitable impact modifiers are thermoplastic polyester elastomers. Polyester elastomers are segmented copolyetheresters containing long-chain segments, generally derived from poly(alkylene) ether glycols, and short-chain segments, derived from low molecular weight diols and dicarboxylic acids. Such products are known per se and are described in the literature, for example in U.S. Pat. No. 3,651,014. Corresponding products are also commercially available under the names of Hytrel® (Du Pont), Arnitel® (Akzo) and Pelprene® (Toyobo Co. Ltd.).

It will be appreciated that it is also possible to use mixtures of different rubbers.

As further additives there may be mentioned for example processing aids, stabilizers and oxidation retardants, agents against thermal decomposition and decomposition by ultraviolet light, lubricating and demolding agents, flame retardants, dyes and pigments and plasticizers. The proportion thereof is generally up to 40%, preferably up to 15%, by weight, based on the total weight of the composition.

Pigments and dyes are generally present in amounts of up to 4%, preferably from 0.5 to 3.5%, especially from 0.5 to 3%, by weight.

The pigments for coloring thermoplastics are commonly known, see for example R. Gächter and H. Müller, Taschenbuch der Kunststoffadditive, Carl Hanser Verlag, 1983, pages 494 to 510. The first preferred group of pigments to be mentioned are white pigments such as zinc oxide, zinc sulfide, lead white (2 $PbCO_3$, $Pb(OH)_2$), lithopone, antimony white and titanium dioxide. Of the two most common crystal polymorphs (rutile and anatase) of titanium dioxide, the rutile form is preferred for use as white pigment for the molding compositions of the invention.

Black pigments which can be used according to the invention are iron oxide black ($Fe_3O_4$), spinel black (Cu(Cr, Fe)$_2O_4$), manganese black (mixture of manganese dioxide, silicon dioxide and iron oxide), cobalt black and antimony black and also, particularly preferably, carbon black, which is usually used in the form of furnace or gas black (see G. Benzing, Pigmente für Anstrichmittel, Expert-Verlag (1988), p. 78ff).

It will be appreciated that inorganic color pigments such as chromium oxide green or organic color pigments such as azo pigments and phthalocyanines can be used according to the invention to obtain certain hues. Such pigments are generally commercially available.

It can further be of advantage to use the abovementioned pigments or dyes in a mixture, for example carbon black with copper phthalocyanines, since this generally facilitates the dispersion of color in the thermoplastic.

Oxidation retardants and thermal stabilizers which can be added to the thermoplastic compositions of the invention include for example halides of metals of group I of the periodic table, e.g., sodium halides, potassium halides, lithium halides, optionally in conjunction with copper(I) halides, for example chlorides, bromides or iodides. The halides, especially of copper, may also contain electron-rich p-ligands. Examples of such copper complexes are copper halide complexes with triphenylphosphine, for example. It is further possible to use zinc fluoride and zinc chloride. Other possibilities are sterically hindered phenols, hydroquinones, substituted representatives of this group, secondary aromatic amines, optionally in conjunction with phosphorus-containing acids and salts thereof, and mixtures of these compounds, preferably in a concentration up to 1% by weight, based on the weight of the mixture.

Examples of UV stabilizers are various substituted resorcinols, salicylates, benzotriazoles and benzophenones, which are generally used in amounts of up to 2% by weight.

Lubricating and demolding agents, which are generally included in the thermoplastic material in amounts of up to 1% by weight, are stearic acid, stearyl alcohol, alkyl stearates and N-alkylstearamides and also esters of pentaerythritol with long-chain fatty acids. It is also possible to use salts of calcium, of zinc or of aluminum of stearic acid and also dialkyl ketones, for example distearyl ketone.

The present invention further provides a polyamide producible by one of the processes.

The novel mixtures of polyamides, especially nylon-6 and its copolymers, and thermoplastic polymers can be used for producing fibers, films and moldings.

The advantages of the process of the invention over existing processes are, inter alia, that the chain length of the thermoplastic polymers is only minimally shortened, if at all, and the polymers are present in the compositions in a state of very fine dispersion. In addition, the invention makes it possible to use aminonitriles for producing nylon-6.

A further advantage is the light self-color of the compositions which are obtainable by the process of the invention.

The Examples which follow illustrate the invention.

EXAMPLES

Sample Preparation and Analysis

The relative viscosity (RV), a measure of the molecular weight buildup and the degree of polymerization, is mea sured in 1% strength by weight solution in the case of extracted material and in 1.1% strength by weight solution in the case of unextracted polymer, in 96% strength sulfuric acid, at 25° C. using an Ubbelohde viscometer. Unextracted polymers are dried under reduced pressure for 20 hours prior to analysis.

The amino and carboxyl end group contents (AEG and CEG, respectively) are determined on extracted polycaprolactam by an acidimetric titration. The amino groups are titrated with perchloric acid in 70:30 (parts by weight) phenol/methanol as solvent. The carboxyl end groups were titrated with potassium hydroxide solution in benzyl alcohol as solvent.

For extraction, 100 parts by weight of polycaprolactam are stirred with 400 parts by weight of demineralized water at 100° C. for 32 hours under reflux and, after removal of the water, dried gently, i.e., without postcondensation, at 100° C. under reduced pressure for 20 hours.

All the experiments were carried out in a multistage process apparatus. The first stage with an empty volume of 1 liter and an internal length of 1000 mm was completely packed with Raschig ring packing elements (3 mm in diameter, 3 mm in length) or with titanium dioxide granules. The granules (type S 150 from Finnti) were 100% $TiO_2$ in the anatase form and had a strand length within the range from 2 to 14 mm, a strand thickness of about 4 mm and a specific surface area of more than 100 $m^2/g$. The second stage used was a 2 liter separating tank. The third stage was a flow pipe (capacity 1 l, length 1000 mm) packed with Raschig rings (6 mm in diameter, 6 mm in length) or with the above-described $TiO_2$ granules. The fourth stage was in turn a separating tank (capacity 2 l) from which the polymer melt produced was removed in strand form with the aid of a gear pump.

The process apparatus was operated both with stages 1, 2 and 4 (Examples 4, 5 and 6) and with stages 1, 2, 3 and 4 (Examples 1, 2 and 3). The thermoplastic polymers were introduced into the reaction mixture prior to the 4th stage. The comparative products or examples were prepared by producing polymers from ACN under the same process conditions, or using the same process parameters, without thermoplastic polymers.

Tabular Representation of Examples

The process parameters and the product properties are depicted in table form below. The throughput is the mass flow of the reaction mixture through the first process stage.

Thermoplastic polymers used
    PS: polyarylene ether sulfone having repeat units of the formula $I_2$, characterized by a viscosity number of 48 ml/g, for example Ultrason S 1010 from BASF.
    SAN: poly(styrene-co-acrylonitrile), characterized by an acrylonitrile content of 25% by weight and a viscosity number of 80 ml/g (measured on 0.5% strength by weight solution in dimethylformamide at 25° C.).

| | Process parameter | | | | | | | | | | | | | | | |
|---|---|---|---|---|---|---|---|---|---|---|---|---|---|---|---|---|
| | | TP[1] | | | Stage 1 | | | Stage 2 | | | Stage 3 | | | | Stage 4 | | |
| Examples | Through-put [g/h] | [% by wt.] | ACN:H$_2$O (molar) | Catalyst[2] | P [bar] | T [° C.] | RES[3] [h] | P [bar] | T [° C.] | Catalyst | WA[4] [%] | P [bar] | T [° C.] | RES [h] | P [bar] | T [° C.] |
| 1 | 300 | PS, 33% | 1:2 | − | 86 | 242 | 1 | 32 | 254 | − | 60 | 36 | 245 | 6 | 1 | 250 |
| 1/Comp. | 300 | 0% | 1:2 | − | 86 | 242 | 1 | 32 | 254 | − | 60 | 36 | 245 | 6 | 1 | 250 |
| 2. | 300 | PS, 33% | 1:2 | − | 86 | 242 | 1 | 32 | 254 | − | 60 | 36 | 245 | 5 | 1 | 250 |
| 2/Comp. | 300 | 0% | 1:2 | − | 86 | 242 | 1 | 32 | 254 | − | 60 | 36 | 245 | 5 | 1 | 250 |
| 3. | 460 | PS, 14% | 1:2 | − | 90 | 270 | 1 | 37 | 252 | − | 60 | 36 | 245 | 4 | 1 | 260 |
| 3/Comp. | 460 | 0% | 1:2 | − | 90 | 270 | 1 | 37 | 252 | − | 60 | 36 | 245 | 4 | 1 | 260 |
| 4 | 300 | PS, 14% | 1:4 | + | 50 | 250 | 1.7 | 30 | 251 | Not carried out | | | | 5 | 1 | 260 |
| 4/Comp. | 300 | 0% | 1:4 | + | 50 | 250 | 1.7 | 30 | 251 | Not carried out | | | | 5 | 1 | 260 |
| 5 | 600 | SAN, 9% | 1:6 | + | 60 | 260 | 1.7 | 30 | 250 | Not carried out | | | | 2.5 | 1 | 250 |
| 6 | 600 | SAN, 9% | 1:6 | + | 60 | 270 | 1.7 | 30 | 251 | Not carried out | | | | 5 | 1 | 250 |

[1]TP: addition of thermoplastic polymer in % by weight, based on mass of reaction mixture with PS = polyarylene ether sulfone and SAN = poly(styrene-co-acrylonitrile)
[2]+ with catalyst/−: without catalyst
[3]RES: residence time of product mixture
[4]WA: water addition in third step, based on inlet stream of reaction mixture into first process stage Results in comparison The product viscosities are report in the melt, measured by oscillatory shearing, and in sulfuric acid as solvent, measured by means of a capillary viscometer. The polymer blends were also analyzed for amino end group content (AEG) and carboxyl end group content (CEG). Purity of aminocapronitrile: 99.5%.

| Examples | Melt viscosity at 270° C. in [Pas] | Relative viscosity | AEG [meq/kg] | CEG [meq/kg] | Relative viscosity after tempering[5] |
|---|---|---|---|---|---|
| 1 | | 2.18 | 44 | 55 | |
| Comp. 1 | | 2.19 | 57 | 63 | |
| 2 | 100 | 1.97 | 30 | 46 | |
| Comp. 2 | | 2.19 | 57 | 63 | |
| 3 | | 2.04 | 44 | 60 | 2.3 |
| Comp. 3 | | 2.18 | 62 | 53 | |
| 4 | | 2.42 | 40 | 22 | |
| Comp. 4 | | 2.50 | 9 | 65 | |
| 5 | | 2.05 | 44 | 56 | |
| 6 | | 2.41 | 26 | 44 | |

[5]The sample was tempered at 160° C. in a stream of nitrogen for 24 hours

We claim:

1. A process for producing polymer blends by reacting at least one aminonitrile with water in the presence of thermoplastic polymers selected from polyarylene ethers, polyetherimides, polyamideimides, styrene homo- and copolymers, rubber-elastic graft copolymers, ethylene copolymers, polyamides prepared from dicarboxylic acids or diamines or mixtures thereof or optionally further polyamide-forming monomer, which comprises the following steps:

(1) reacting at least one aminonitrile with water at a temperature from 90 to 400° C. and a pressure from 0.1 to 35×10$^6$ Pa to obtain reaction mixture, (2) further reacting the reaction mixture at a temperature from 150 to 400° C. and a pressure which is lower than the pressure in step 1, the temperature and pressure being selected so as to obtain a first gas phase and a first liquid or a first solid phase or a mixture of first solid and first liquid phase and the first gas phase is separated from the first liquid or the first solid phase or the mixture of first liquid and first solid phase, and (3) admixing the first liquid or the first solid phase or the mixture of first liquid and first solid phase with a gaseous or liquid phase comprising water at a temperature from 150 to 370° C. and a pressure from 0.1 to 30×10$^6$ Pa to obtain the polymer blend, wherein in one or more of the steps the thermoplastic polymers and optionally further polyamide-forming monomers are added, wherein the reaction in steps 1,2 and/or 3 is performed in the presence of a Bronsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of titanium dioxide may be replaced by tungsten oxide.

2. A process as claimed in claim 1, additionally comprising the following step:

(4) postcondensing the polymer blend at a temperature from 200 to 350° C. and a pressure which is lower than the pressure of step 3, the temperature and pressure being selected so as to obtain a second, water- and ammonia-comprising gas phase and a second liquid or second solid phase or a mixture of second liquid and second solid phase, which each comprise the polymer blend.

3. A process for producing polymer blends by reacting at least one aminonitrile with water in the presence of thermoplastic polymers selected from polyarylene ethers, polyetherimides, polyamideimides, styrene homo- and copolymers, rubber-elastic graft copolymers, ethylene copolymers, polyamides prepared from dicarboxylic acids or diamines or mixtures thereof or optionally further polyamide-forming monomers, which comprises the following steps:

(1) reacting at least one aminonitriles with water at a temperature from 90 to 400° C. and a pressure from 0.1 to 35×10$^6$ Pa to obtain reaction mixture, (2) further reacting the reaction mixture at a temperature from 150 to 400° C. and a pressure which is lower than the pressure in step 1, the temperature and pressure being selected so as to obtain a first gas phase and a first liquid or first solid phase or a mixture of first solid and first liquid phase and the first gas phase is separated from the first liquid or the first solid phase or the mixture of first liquid and first solid phase, and (3) postcondensing the first liquid or the first solid phase or the mixture of first liquid and first solid phase at a temperature from 200 to 350° C. and a pressure which is lower than the pressure of step 2, the temperature and pressure being selected so as to obtain a second, water-and ammonia-comprising gas phase and a second liquid or second solid phase or a mixture of second liquid and second solid phase, which each comprise the polymer blend, wherein in one or more of the steps the thermoplastic polymers and optionally further polyamide-forming monomers are added, wherein the reaction in steps 1, 2, and/or 3 is carried out in the presence of a Brönsted acid catalyst selected from a beta-zeolite catalyst, a sheet-silicate catalyst or a titanium dioxide catalyst comprising from 70 to 100% by weight of anatase and from 0 to 30% by weight of rutile and in which up to 40% by weight of the titanium dioxide may be replaced by tungsten oxide.

4. A process as claimed in claim 1, wherein aminonitriles account in total for from 30 to 100% by weight of the polyamide-forming monomers.

5. A process as claimed in claim 1, wherein the thermoplastic polymer content of the reaction mixture is from 1 to 75% by weight, based on the entire reaction mixture.

6. A process as claimed in claim 1, wherein the aminonitrile used is an aminoalkyl nitrile having an alkylene moiety ($-CH_2-$) of from 4 to 12 carbon atoms or an aminoalkylaryl nitrile having from 8 to 13 carbon atoms.

* * * * *

UNITED STATES PATENT AND TRADEMARK OFFICE
CERTIFICATE OF CORRECTION

PATENT NO. : 6,355,737 B1
DATED : March 12, 2002
INVENTOR(S) : Mohrschladt et al.

It is certified that error appears in the above-identified patent and that said Letters Patent is hereby corrected as shown below:

<u>Title page,</u>
Item [22], "Feb. 28, 1999" should be -- Feb. 26, 1999 --.

Signed and Sealed this

Third Day of September, 2002

Attest:

Attesting Officer

JAMES E. ROGAN
*Director of the United States Patent and Trademark Office*